United States Patent
Kwon et al.

(10) Patent No.: US 10,162,458 B2
(45) Date of Patent: Dec. 25, 2018

(54) TOUCH INTEGRATED CIRCUIT, AND TOUCH DISPLAY DEVICE AND METHOD OF DRIVING THE SAME

(71) Applicant: LG DISPLAY CO., LTD., Seoul (KR)

(72) Inventors: Soonho Kwon, Seoul (KR); HongSung Song, Seoul (KR); Hui Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/224,041

(22) Filed: Jul. 29, 2016

(65) Prior Publication Data
US 2017/0031505 A1 Feb. 2, 2017

(30) Foreign Application Priority Data
Jul. 31, 2015 (KR) ........................ 10-2015-0109174

(51) Int. Cl.
*G06F 3/041* (2006.01)
*G06F 3/044* (2006.01)
*G06F 3/047* (2006.01)
*G02F 1/1333* (2006.01)

(52) U.S. Cl.
CPC ........ *G06F 3/0416* (2013.01); *G02F 1/13338* (2013.01); *G06F 3/044* (2013.01); *G06F 3/047* (2013.01); *G06F 3/0412* (2013.01); *G06F 2203/04103* (2013.01)

(58) Field of Classification Search
CPC ........ G06F 3/0416; G06F 3/047; G06F 3/044; G06F 3/0412; G06F 2203/04103; G02F 1/13338
See application file for complete search history.

(56) References Cited

U.S. PATENT DOCUMENTS

| | | | | |
|---|---|---|---|---|
| 2009/0146938 A1* | 6/2009 | Takada | ................. | G09G 3/3648 345/98 |
| 2009/0267917 A1* | 10/2009 | Lee | ...................... | G02F 1/13338 345/174 |
| 2010/0194707 A1* | 8/2010 | Hotelling | .............. | G06F 3/0412 345/173 |
| 2011/0141151 A1* | 6/2011 | Fujioka | ................. | G06F 1/3203 345/690 |
| 2012/0056663 A1* | 3/2012 | Oh | ......................... | G06F 3/0412 327/517 |
| 2013/0314360 A1* | 11/2013 | Saitoh | .................... | G06F 3/0412 345/173 |
| 2013/0342479 A1* | 12/2013 | Pyo | .......................... | G09G 3/00 345/173 |
| 2014/0320427 A1* | 10/2014 | Lee | ....................... | G06F 3/0416 345/173 |
| 2015/0168757 A1* | 6/2015 | Jeong | .................... | G02F 1/1368 349/41 |
| 2016/0349889 A1* | 12/2016 | Yang | ................... | G02F 1/13338 |

* cited by examiner

*Primary Examiner* — Premal R Patel
(74) *Attorney, Agent, or Firm* — Dentons US LLP (57) ABSTRACT

Disclosed are an in-cell touch type touch display device that includes a touch display panel, where a plurality of touch sensors are disposed, and a driving circuit unit. Each of the plurality of touch sensors are disposed to correspond to a plurality of subpixels, and each of the plurality of touch sensors may include one or more touch switches. The one or more touch switches disposed in each of the plurality of touch sensors divisionally drive the plurality of touch sensors by 1/n (where n is a natural number equal to or more than two).

10 Claims, 8 Drawing Sheets

TOUCH INTEGRATED CIRCUIT, AND TOUCH DISPLAY DEVICE AND METHOD OF DRIVING THE SAME

CROSS-REFERENCE TO RELATED APPLICATIONS

This application claims the benefit of Korean Patent Application No. 10-2015-0109174 filed on Jul. 31, 2015, which is hereby incorporated by reference as if fully set forth herein.

BACKGROUND

Field of the Invention

The present invention relates to an in-cell touch type touch display device, and more particularly, to a touch integrated circuit (IC) and a touch display device with enhanced transmittance and a method of driving the same.

Discussion of the Related Art

Instead of using conventional input devices such as a mouse or a keyboard, a touch panel, which enables a user to directly input information through a screen with a finger or a pen, is being applied to display devices. Since all users can easily manipulate the touch panel, the application of the touch panel is being expanded.

Touch panels are categorized into a resistive type, a capacitance type, an infrared type, etc. depending on a touch sensing method. Recently, since the capacitance type provides convenience in a manufacturing process and is good in touch sensitivity, the capacitance type is attracting much attention. Capacitive touch panels are categorized into a mutual capacitance type and a self-capacitance type.

Recently, liquid crystal display (LCD) devices to which a touch screen is applied have been developed in an in-cell touch type where a capacitive touch sensor is built into a liquid crystal panel, for slimming the LCD devices. In the following description, a touch display panel denotes that the touch sensor is built into the liquid crystal panel.

Figure 1:
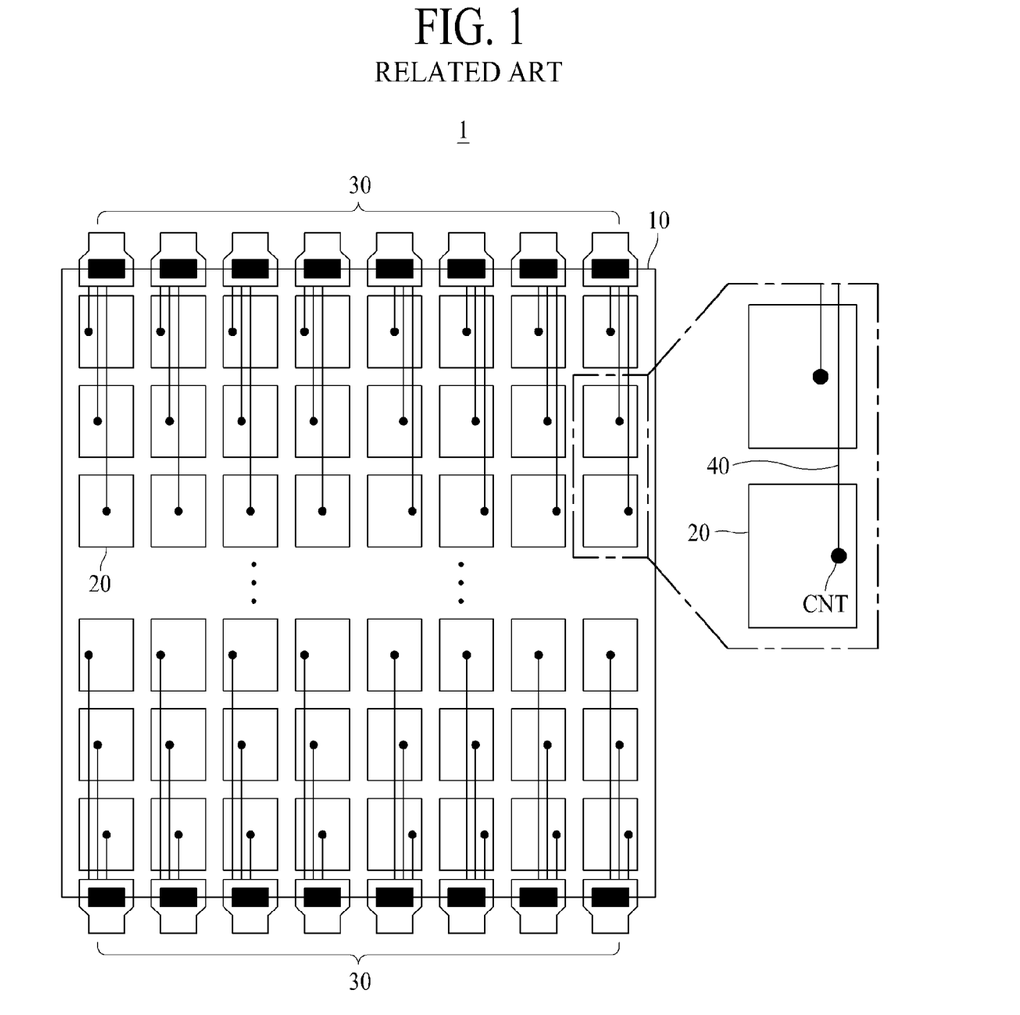
FIG. 1 is a diagram schematically illustrating a related art touch display device.
Figure 2:
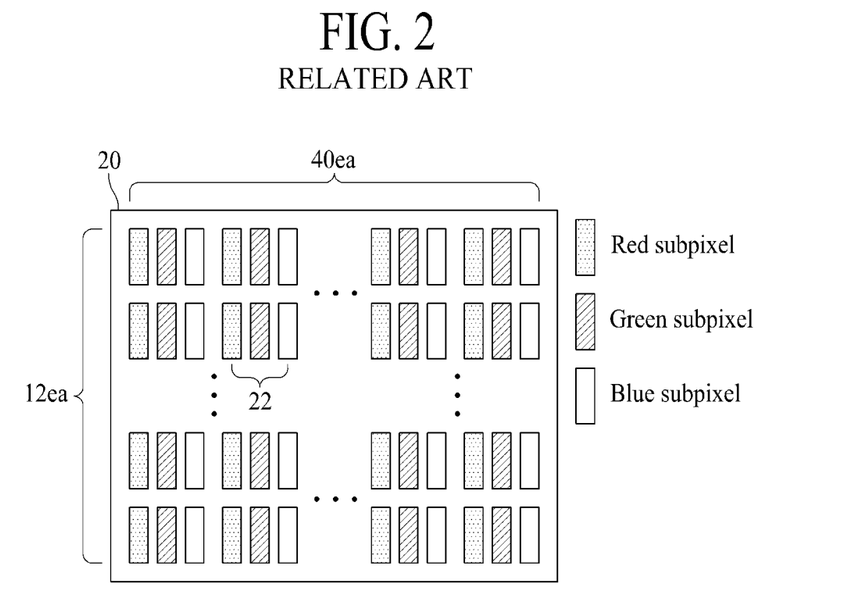
FIG. 2 is a diagram illustrating that one touch sensor is provided in an area corresponding to a plurality of pixels.

FIG. 1 is a diagram schematically illustrating a related art touch display device. FIG. 2 is a diagram illustrating that one touch sensor is provided in an area corresponding to a plurality of pixels.

Referring to FIGS. 1 and 2, the related art touch display device 1 includes a touch display panel 10 and a driving circuit unit. In FIG. 1, a source/touch driver 30 included in the driving circuit unit is illustrated, but a gate driver, a timing controller, and a touch sensing unit included in the driving circuit unit are not illustrated.

The source/touch driver 30 includes a plurality of source/touch driving ICs. A half of the plurality of source/touch driving ICs are disposed on an upper end of the touch display panel 10, and the other half are disposed on a lower end of the touch display panel 10. A plurality of touch sensors 20 are disposed in the touch display panel 10, and each of the touch sensors 20 is connected to a corresponding source/touch driving IC through a touch line 40.

One touch sensor 20 may be disposed to correspond to a plurality of pixels. For example, each of the touch sensors 20 may be disposed in an area which corresponds to forty pixels in a horizontal direction and twelve pixels in a vertical direction. In this case, each of the touch sensors 20 is configured by a common electrode which is disposed for displaying an image. That is, the plurality of touch sensors 20 are configured by patterning the common electrode.

One frame period is divided into a display period and a touch period, and a display operation and a touch sensing operation are time-divisionally performed. In the display period, a data voltage is supplied to a pixel electrode, and a common voltage (Vcom) is supplied to the plurality of touch sensors 20, thereby displaying an image. In the touch period, the source/touch driver 30 supplies a touch driving signal to each of the touch sensors 20, and the touch sensing unit receives a capacitance charged into each of the touch sensors 20 and senses a variation of the capacitance of each of the touch sensors 20 to determine whether there is a touch and detect a touch position.

In large-screen touch display devices that display an image at a resolution of 4K ultra high definition (UHD) or more, the number of touch sensors 20 increases in proportion to a screen size, and for this reason, the number of touch lines 40 increases. For example, in 86 inches touch display devices, if each of the touch sensors 20 is configured as illustrated in FIG. 2, a total of 51,840 touch sensors 20 are provided, and at least touch lines 40 equal to the number of the touch sensors 20 are provided. If the number of touch lines 40 increases, the number of contacts, which respectively connect the touch lines 40 to the touch sensors 20, also increases.

As the number of touch lines 40 increases, the transmittance of the touch display panel 10 is lowered, whereby display quality is degraded. Also, the number of input and output channels of each of the source/touch driving ICs increases in proportion to the number of touch lines 40, and thus, the size of the source/touch driver 30 is enlarged, thereby increasing the manufacturing cost.

SUMMARY

Accordingly, the present invention is directed to provide a touch integrated circuit (IC), and a touch display device and a method of driving the same that substantially obviate one or more problems due to limitations and disadvantages of the related art.

An aspect of the present invention is directed to provide an in-cell touch type touch display device in which the number of touch lines is reduced.

Another aspect of the present invention is directed to provide an in-cell touch type touch display device in which a transmittance is enhanced.

Another aspect of the present invention is directed to provide an in-cell touch type touch display device in which the number of input and output channels of each of source/touch driving ICs is reduced, and thus, a size of a source/touch driver is reduced.

Another aspect of the present invention is directed to provide an in-cell touch type touch display device in which the number of input and output channels of each of source/touch driving ICs is reduced, and thus, the manufacturing cost is reduced.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch display device including a touch display panel, where a plurality of touch sensors are disposed, and a driving circuit unit. Each of the plurality of touch sensors disposed in the touch display panel are disposed to correspond to a plurality of subpixels, and each of the plurality of touch sensors may include one or more touch switches. Here, The one or more touch switches disposed in each of the plurality of touch sensors divisionally drive the plurality of touch sensors by 1/n (where n is a natural number equal to or more than two). A timing controller of the driving circuit unit generates a switch control signal for controlling the plurality of touch switches, and a gate driver of the driving circuit unit generates a switch enable signal according to the switch control signal to supply the switch enable signal to the plurality of touch switches. Also, a source/touch driver respectively supplies image signals to the plurality of subpixels and supplies a touch driving signal to the plurality of touch sensors, and a touch sensing unit senses a variation of a capacitance received from each of the plurality of touch sensors.

In the touch display device, the plurality of touch sensors may be divided into a plurality of odd touch sensors and a plurality of even touch sensors, the touch driving signal may be supplied to the plurality of odd touch sensors and the plurality of even touch sensors, and a capacitance may be received from each of the plurality of touch sensors. In an odd touch period, the gate driver may supply an odd switch enable signal to a plurality of odd touch switches respectively included in the plurality of odd touch sensors to turn on the plurality of odd touch switches, and in an even touch period, the gate driver may supply an even switch enable signal to a plurality of even touch switches respectively included in the plurality of even touch sensors to turn on the plurality of even touch switches.

In another aspect of the present invention, there is provided a method of driving a touch display device. The method may supply a touch driving signal to a plurality of odd touch sensors and a plurality of even touch sensors into which the plurality of touch sensors are divided and may receive a capacitance from each of the plurality of touch sensors. In the odd touch period, the method may supply an odd switch enable signal to a plurality of odd touch switches respectively included in the plurality of odd touch sensors to turn on the plurality of odd touch switches. In the odd touch period, the method may supply a first touch driving signal to the plurality of odd touch sensors. Subsequently, the method may sense a variation of a capacitance received from each of the plurality of odd touch sensors to detect a touch position.

In the even touch period, the method may supply an even switch enable signal to a plurality of even touch switches respectively included in the plurality of even touch sensors to turn on the plurality of even touch switches. In the even touch period, the method may supply a second touch driving signal to the plurality of even touch sensors. Subsequently, the method may sense a variation of a capacitance received from each of the plurality of even touch sensors to detect the touch position.

In another aspect of the present invention, there is provided a touch integrated circuit (IC) including a touch driver and a touch sensing unit. The touch driver may supply a touch driving signal to a plurality of touch sensors disposed in a touch display panel. The touch sensing unit may sense a variation of a capacitance from each of the plurality of touch sensors. Here, the touch driver may divide the plurality of touch sensors into a plurality of odd touch sensors and a plurality of even touch sensors. In an odd touch period, the touch driver may supply the touch driving signal to the plurality of odd touch sensors, and the touch sensing unit senses a variation of a capacitance from each of the plurality of odd touch sensors. In an even touch period, the touch driver may supply the touch driving signal to the plurality of even touch sensors, and the touch sensing unit may sense a variation of a capacitance from each of the plurality of even touch sensors.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF ILLUSTRATED EMBODIMENTS

Reference will now be made in detail to exemplary embodiments of the present invention, examples of which are illustrated in the accompanying drawings. Wherever possible, the same reference numbers will be used throughout the drawings to refer to the same or like parts.

In the specification, it should be noted that like reference numerals already used to denote like elements in other drawings are used for elements wherever possible. In the following description, when a function and a configuration known to those skilled in the art are irrelevant to the essential configuration of the present invention, their detailed descriptions will be omitted. The terms described in the specification should be understood as follows.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Furthermore, the present invention is only defined by scopes of claims.

In the specification, in adding reference numerals for elements in each drawing, it should be noted that like reference numerals already used to denote like elements in other drawings are used for elements wherever possible.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

LCD devices have been variously developed in a twisted nematic (TN) mode, a vertical alignment (VA) mode, an in-plane switching (IPS) mode, and a fringe field switching (FFS) mode depending on to a method of adjusting the alignment of liquid crystal.

The TN mode and the VA mode among the modes are modes in which a pixel electrode is disposed on a lower substrate, and a common electrode is disposed on an upper substrate (a color filter array substrate), thereby adjusting the alignment of liquid crystal with a vertical electric field.

The IPS mode and the FFS mode are modes in which a pixel electrode and a common electrode are disposed on a lower substrate, and the alignment of liquid crystal is adjusted with an electric field between the pixel electrode and the common electrode.

The IPS mode is a mode in which a plurality of pixel electrodes and a plurality of common electrodes are alternately arranged in parallel, and thus, a lateral electric field is generated between a pixel electrode and a common electrode adjacent to each other, thereby adjusting the alignment of liquid crystal. The FFS mode is a mode in which a pixel electrode and a common electrode are provided in plurality to be spaced apart from each other with an insulating layer therebetween. In this case, one electrodes of the pixel electrodes and common electrodes are formed in a plate shape or a pattern, and the other electrodes are formed in a finger shape. The FFS mode is a mode that adjusts the alignment of liquid crystal with fringe fields generated between the pixel electrodes and common electrodes.

A mode of a touch panel according to an embodiment of the present invention is not limited, and a vertical alignment mode (the TN mode and the VA mode) and an in-plane switching mode (the IPS mode and the FFS mode) may be applied to the touch panel according to an embodiment of the present invention. In this disclosure below, an example where the IPS mode or the FFS mode is applied to the touch panel will be described.

Hereinafter, a touch display device and a method of driving the same according to embodiments of the present invention will be described based on an example where a plurality of touch sensors are arranged in a touch display panel, and touch sensing is performed in a self-capacitance type.

However, the present invention is not limited thereto, and the touch display device and the method of driving the same according to embodiments of the present invention may also be based on another example where a plurality of touch driving electrodes and a plurality of touch sensing electrodes are arranged in a touch display panel, and touch sensing is performed in a mutual capacitance type.

Hereinafter, a touch display device and a method of driving the same according to embodiments of the present invention will be described in detail with reference to the accompanying drawings.

Figure 3A:
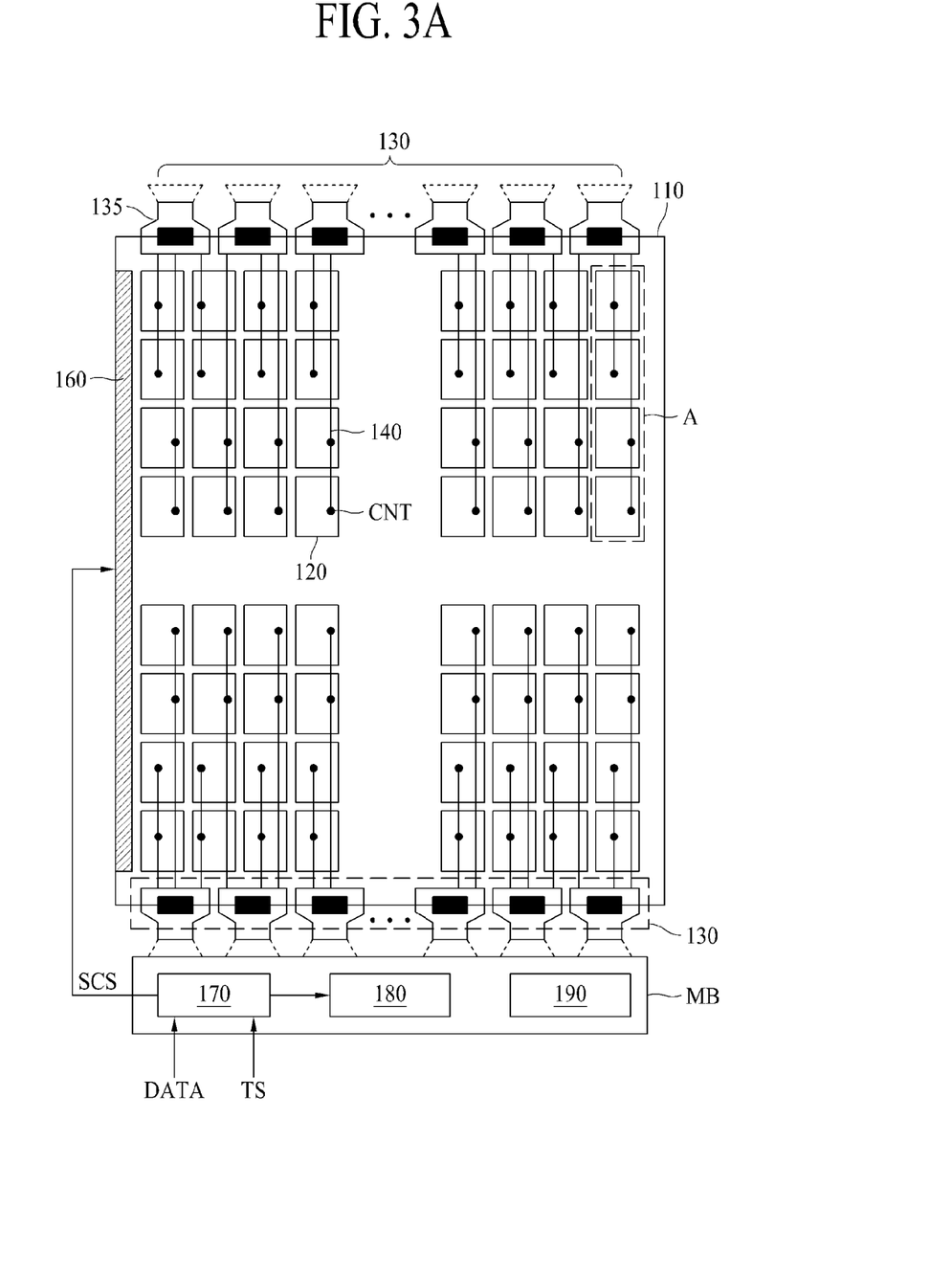
FIG. 3A illustrates a touch display device according to an embodiment of the present invention and is a diagram illustrating that a gate driver is disposed in a non-display area of a liquid crystal panel in a gate-in panel (GIP) type.
Figure 3B:
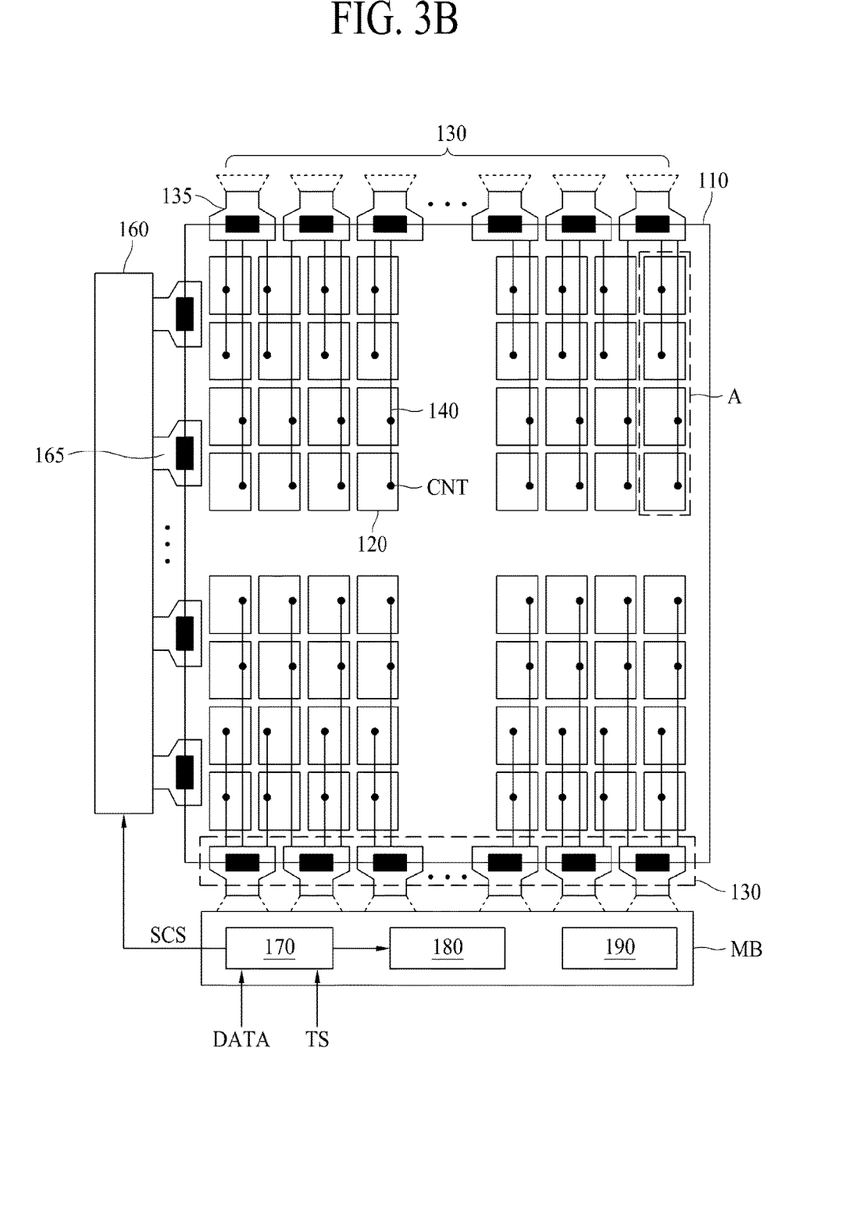
FIG. 3B illustrates a touch display device according to another embodiment of the present invention and is a diagram illustrating that a gate driver including a plurality of gate driving ICs is disposed on a side surface of a liquid crystal panel.

FIG. 3A illustrates a touch display device according to an embodiment of the present invention and is a diagram illustrating that a gate driver is disposed in a non-display area of a liquid crystal panel in a gate-in panel (GIP) type. FIG. 3B illustrates a touch display device according to another embodiment of the present invention and is a diagram illustrating that a gate driver including a plurality of gate driving ICs is disposed on a side surface of a liquid crystal panel.

Referring to FIGS. 3A and 3B, a touch display device according to an embodiment of the present invention may include a touch display panel 110 and a driving circuit unit. A plurality of touch sensors 120 may be disposed in the touch display panel 110. The touch sensors 120 will be described below. The driving circuit unit may include a source/touch driver 130 including a plurality of source/touch driving ICs, a gate driver 160, a timing controller 170, a touch sensing unit 180, and a power supply 190. The touch display panel 110 may include a liquid crystal panel and a plurality of touch sensors 120 coupled to the liquid crystal panel, and light should be supplied to the touch display panel 110 so as to display an image. To this end, the touch display device 100 may include a backlight unit. The backlight unit is not illustrated in FIGS. 3A and 3B.

The touch display panel 110 may include a thin film transistor (TFT) array substrate, a color filter array substrate, and a liquid crystal layer disposed therebetween.

A plurality of RGB color filters may be disposed on the color filter array substrate to respectively correspond to a plurality of subpixels. Also, a black matrix that defines an opening area of each of the subpixels and prevents colors from being mixed with each other may be disposed on the color filter array substrate.

The plurality of subpixels may be arranged in a matrix type on the TFT array substrate 110 and may be defined by a plurality of data lines and a plurality of gate lines which intersect each other. A red (R) subpixel, a green (G) subpixel, and a blue (B) subpixel may configure one pixel. Each of the subpixels may include a TFT which is a switching element, a pixel electrode, a common electrode, and a storage capacitor (Cst). Here, the pixel electrode may be provided in each of the subpixels, and the common electrode may be provided in units of a plurality of subpixels. In the present embodiment, the common electrode may be used as each of the touch sensors 120, in addition to an electrode for displaying an image. To this end, the plurality of touch sensors 120 may be provided by patterning the common electrode in units of a plurality of subpixels. The pixel electrode and the common electrode (the touch sensors 120) may each be formed of a transparent conductive material such as indium tin oxide (ITO) and/or the like.

Figure 4:
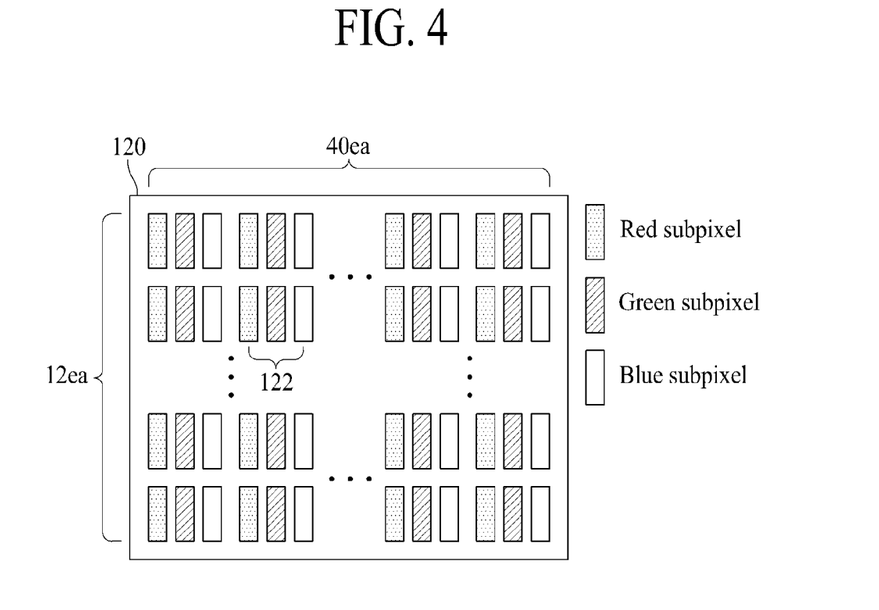
FIG. 4 is a diagram illustrating that one touch sensor is provided in an area corresponding to a plurality of pixels.

FIG. 4 is a diagram illustrating that one touch sensor is provided in an area corresponding to a plurality of pixels. In FIG. 4, one of a plurality of touch sensors 120 is illustrated as an example.

Referring to FIG. 4, the plurality of touch sensors 120 may each be provided in an area corresponding to a plurality of pixels. Each of the plurality of touch sensors 120 may be disposed in an area which corresponds to forty pixels in a horizontal direction and twelve pixels in a vertical direction. That is, one touch sensor 120 may be disposed in an area corresponding to 480 pixels. However, the present embodiment is not limited thereto, and a size of each of the touch sensors 120 may be modified based on a size of the touch display panel 110 and desired touch performance. The plurality of touch sensors 120 may not be disposed in the same size, and for example, second touch sensors disposed an outer portion (edges of four surfaces) of the touch display panel 110 may be smaller in size than first touch sensors disposed in a middle portion of the touch display panel 110.

Figure 5:
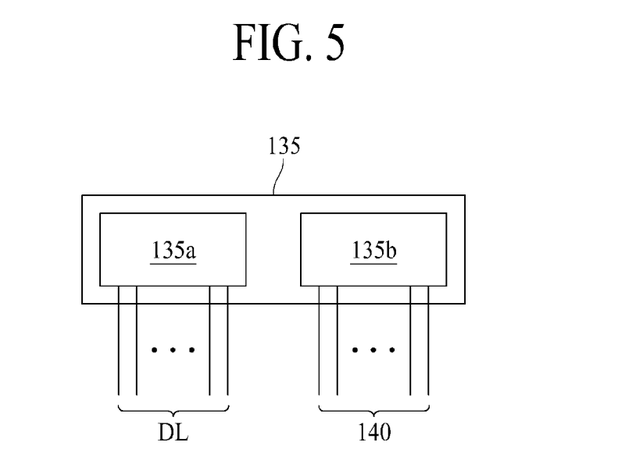
FIG. 5 is a diagram illustrating one of a plurality of source/touch driving ICs disposed in a source/touch driver according to an embodiment of the present invention.

FIG. 5 is a diagram illustrating one of a plurality of source/touch driving ICs disposed in a source/touch driver according to an embodiment of the present invention.

Referring to FIGS. 3A, 3B and 5, a source/touch driving IC 135 may include a data driver 135a and a touch driver 135b. In FIG. 5, the source/touch driving IC 135 is illustrated as including one data driver 135a and one touch driver 135b, but is not limited thereto. The source/touch driving IC 135 may include the one data driver 135a and a plurality of touch drivers 135b.

A plurality of data lines DL respectively disposed in a plurality of subpixels may be connected to the data driver 135a, and an image signal (a pixel electrode voltage) may be supplied to each of the subpixels through a corresponding data line DL.

Also, the plurality of touch sensors 120 disposed in the touch display panel 110 may be connected to the source/touch driver 130 through a plurality of touch lines 140, respectively. Here, touch lines 140 equal to 1/n (where n is a natural number equal to or more than two) of the number of the touch sensors 120 may be provided.

Here, the touch lines 140 may be arranged in the same direction as the data lines DL. The touch lines 140 may be disposed on the same layer as the data lines DL. However, the present embodiment is not limited thereto, and the touch lines 140 may be disposed on a layer different from a layer on which the data lines DL are disposed.

If the touch lines 140 and the data lines DL are disposed on different layers, the touch lines 140 and the data lines DL are disposed to overlap each other. In this case, the touch lines 140 may be disposed over the data lines DL.

Figure 6:
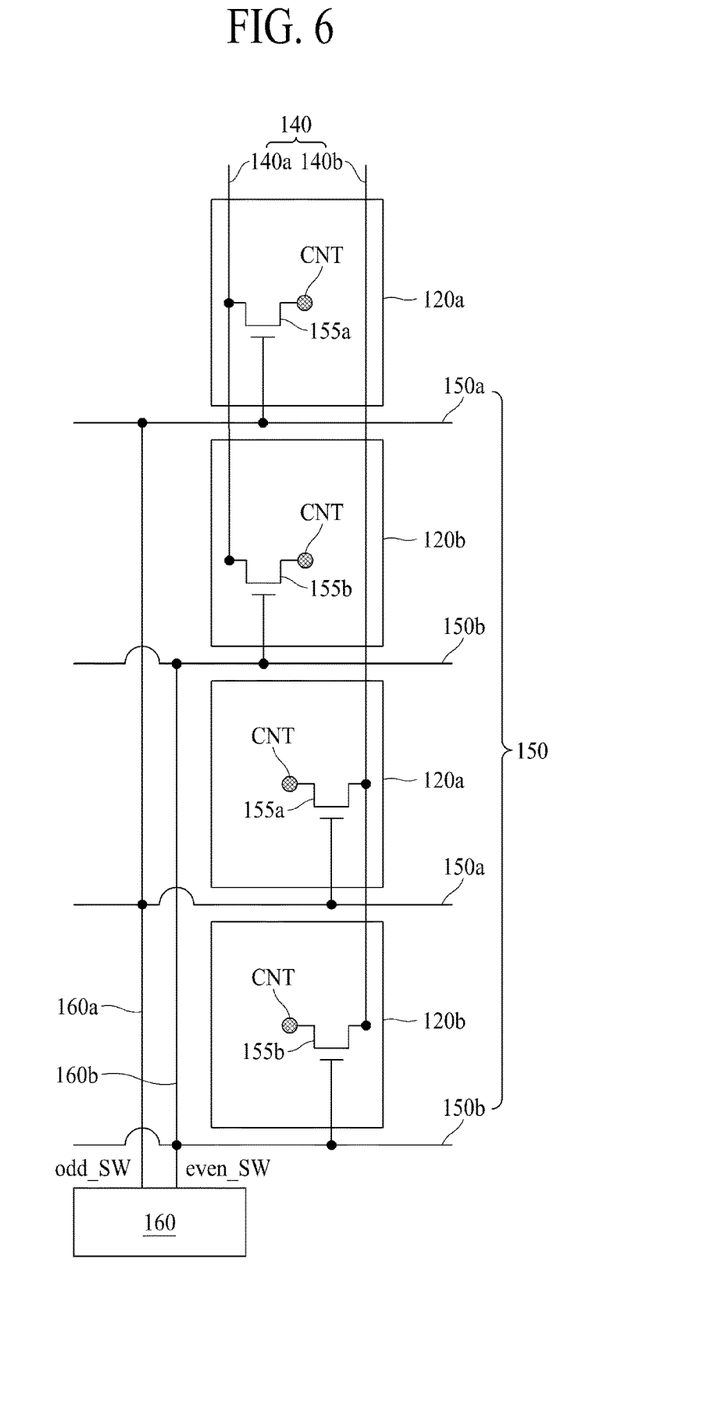
FIG. 6 illustrates an enlarged portion A of FIG. 3A or 3B and is a diagram illustrating four vertically adjacent touch sensors.

FIG. 6 illustrates an enlarged portion A of FIG. 3A or 3B and is a diagram illustrating four vertically adjacent touch sensors.

Referring to FIG. 6, an example where two vertically adjacent touch sensors 120 are connected to one touch line 140 is illustrated. That is, a touch driving signal may be supplied to two touch sensors 120 through one touch line 140, and the touch sensing unit 180 may receive capacitances of the two touch sensors 120. In this case, touch lines 140 equal to ½ of the number of the touch sensors 120 may be provided.

Here, a plurality of touch switches 155a and 155b included in each of the plurality of touch sensors 120 may divisionally drive the plurality of touch sensors 120 by ½. In this case, each of the plurality of touch sensors 120 may include one or more touch switches 155a or 155b.

A plurality of odd touch sensors 120a which are disposed on an odd line with respect to a horizontal line may each include an odd touch switch 155a, and a plurality of even touch sensors 120b disposed on an even line may each include an even touch switch 155b. Here, the plurality of odd touch switches 155a and the plurality of even touch switches 155b may be a TFT, and the odd touch witches 155a and the even touch switches 155b may be formed simultaneously in a process of forming TFTs respectively connected to pixel electrodes of the subpixels.

In FIG. 6, one touch sensor 120 is illustrated as including one touch switch 155a or 155b, but is not limited thereto. In other embodiments, in order to enhance contact performance between the touch lines 140 and the touch sensors 120, one touch sensor 120 may include two or more touch switches 155a or 155b.

Three vertically adjacent touch sensors 120 may be connected to one touch line 140. In this case, touch lines 140 equal to ⅓ of the number of the touch sensors 120 may be provided.

In the touch display device 100 according to an embodiment of the present invention, the touch driving signal may be supplied to a plurality of vertically adjacent touch sensors 120 through one touch line 140, and thus, the number of input/output channels of the source/touch driver 130 is reduced by 1/n (where n is a natural number equal to or more than two). In this manner, since the number of input/output channels of the source/touch driver 130 is reduced, a size of the source/touch driver 130 is reduced, thereby decreasing the manufacturing cost. Particularly, if the number of the touch lines 140 disposed in the touch display panel 110 is reduced by 1/n, a transmittance increases, thereby enhancing display quality.

The touch display device 100 according to an embodiment of the present invention may distinguish the display period and the touch period to display an image and sense a touch. For example, the touch display device 100 may divide one frame period into the display period and the touch period to time-divisionally perform a display operation and a touch sensing operation. Here, the touch display device 100 may divide the touch period into an odd touch period and an even touch period and may divide all of the touch sensors 120 into a plurality of odd touch sensors 120a and a plurality of even touch sensors 120b, thereby sensing a touch.

In the display period, a data voltage may be supplied to a pixel electrode, and a common voltage (Vcom) is supplied to the plurality of touch sensors 120, thereby displaying an image. In the touch period, the source/touch driver 130 may supply the touch driving signal to each of the touch sensors 120, and the touch sensing unit 180 may detect a variation of the capacitance of each of the touch sensors 120 to determine whether there is a touch and detect a touch position.

Referring again to FIGS. 3A and 3B, the driving circuit unit may include the source/touch driver 130 including the plurality of source/touch driving ICs 135, the gate driver 160, the timing controller 170, the touch sensing unit 180, and the power supply 190. All or some of the elements of the driving circuit unit may be disposed in the touch display panel 110 in a chip-on glass (COG) type or a chip-on film (COF, chip-on flexible printed circuit) type.

As illustrated in FIG. 3A, the gate driver 160 may be provided on the TFT array substrate of the touch display panel 110 in an amorphous silicon gate (ASG) type or a gate-in panel (GIP) type. Also, as illustrated in FIG. 3B, the gate driver 160 may include a plurality of gate driving ICs 165 and may be disposed on a side surface of the touch display panel 110. In FIGS. 3A and 3B, the gate driver 160 is illustrated as being disposed on only one side surface of the touch display panel 110, but is not limited thereto. The gate driver 160 may be disposed on each of both side surfaces of the touch display panel 110.

The timing controller 170 may convert input RGB image signals into frame-unit digital RGB image data by using a timing signal TS input from the outside and may supply the RGB image data to the source/touch driver 130. In this case, the timing signal TS may include a vertical sync signal V-sync, a horizontal sync signal H-sync, a clock signal CLK, etc.

The timing controller 170 may generate a switch control signal SCS for controlling the touch switches 155a and 155b included in each of the plurality of touch sensors 120 by using the timing signal TS and may supply the generated switch control signal SCS to the gate driver 160.

The timing controller 170 may further generate a gate control signal GCS for controlling the gate driver 160 by using the timing signal TS to supply the gate control signal GCS to the gate driver 160. The gate control signal GCS may include a gate start pulse GSP, a gate shift clock GSC, a gate output enable signal GOE, etc.

The timing controller 170 may further generate a data control signal DCS for controlling the source/touch driver 130 by using the timing signal TS and may supply the data control signal DCS to the source/touch driver 130. The data control signal DCS may include a source start pulse SSP, a source sampling clock SSC, a source output enable signal SOE, a polarity control signal POL, etc.

The timing controller 170 may supply a synchronization signal for distinguishing the display period and the touch period to the touch sensing unit 180, in order for the touch sensing unit 180 to be driven in the touch period. That is, the touch sensing unit 180 may distinguish the display period and the touch period, based on the synchronization signal supplied from the timing controller 170 and may divide the touch period into the odd touch period and the even touch period, thereby sensing a touch.

As illustrated in FIGS. 3A, 3B and 6, in one frame period, the gate driver 160 may generate a switch enable signal according to the switch control signal SCS supplied from the timing controller 170, and in the touch period of the one frame period, the gate driver 160 may supply the switch enable signal to the touch switches 155a and 155b included in each of the touch sensors 120.

In the display period of the one frame period, the gate driver 160 may sequentially supply a gate driving signal to a plurality of gate lines GL disposed in the touch display panel 110. The TFT included in each subpixel may be turned on by the gate driving signal.

Figure 7:
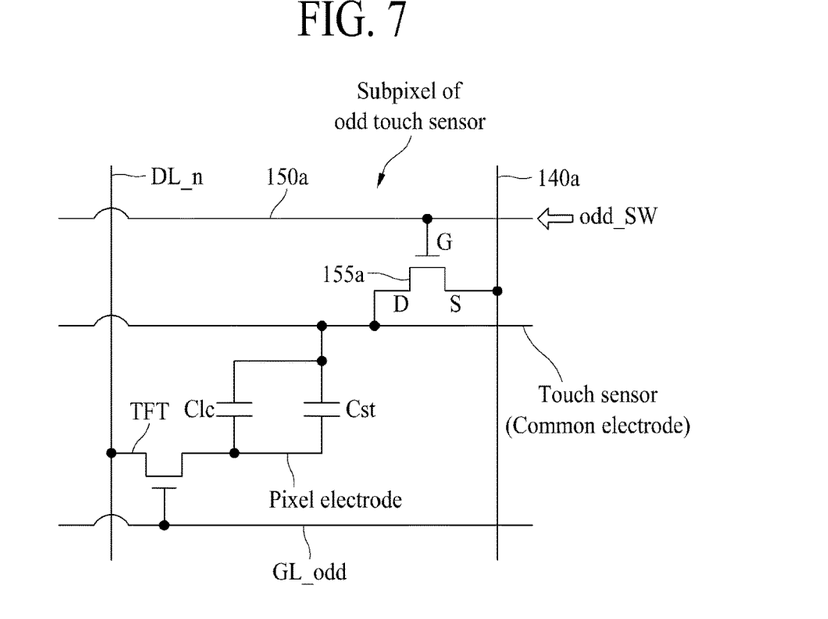
FIG. 7 is a diagram illustrating an equivalent circuit of a subpixel including a touch switch among a plurality of subpixels included in an odd touch sensor.

FIG. 7 is a diagram illustrating an equivalent circuit of a subpixel including a touch switch among a plurality of subpixels included in an odd touch sensor.

Referring to FIGS. 6 and 7, an odd switching signal line 150a may be disposed in a subpixel including the odd touch switch 155a among a plurality of subpixels corresponding to the odd touch sensor 120a. Therefore, odd switching signal lines 150a equal to the number of odd touch sensors 120a provided in the touch display panel 110 may be provided. Here, the odd switching signal lines 150a may be arranged in the same direction as the gate lines GL and may be formed simultaneously in a process of forming the gate lines GL.

Each of a plurality of odd switching signal lines 150a may be connected to an odd link line 160a connected to an output terminal of the gate driver 160. A gate electrode G of the odd touch switch 155a included in each of the plurality of odd touch sensors 120a may be connected to a corresponding odd switching signal line 150a. A source electrode S of the odd touch switch 155a may be connected to a corresponding odd touch line 140a. Also, a drain electrode D of the odd touch switch 155a may be connected to a corresponding odd touch sensor 120a. In this case, the drain electrode D of the odd touch switch 155a and the odd touch sensor 120a may be disposed on physically different layers, and the drain electrode D of the odd touch switch 155a may be electrically connected to the odd touch sensor 120a through a contact part CNT.

The gate driver 160 may generate an odd switch enable signal odd_SW for turning on the odd touch switch 155a included in each of the odd touch sensor 120a in the plurality of touch sensors 120.

Subsequently, the gate driver 160 may output the odd switch enable signal odd_SW to the odd link line 160a. The odd switch enable signal odd_SW output from the gate driver 160 may be supplied to the gate electrode G of the odd touch switch 155a included in the odd touch sensor 120a via the odd switching signal line 150a.

When the odd switch enable signal odd_SW is supplied to the gate electrode G of the odd touch switch 155a, the odd touch switch 155a may be turned on. At this time, a first touch driving signal applied to the odd touch line 140a may be supplied to the odd touch sensor 120a via the odd touch switch 155a. An electric charge may be charged into the odd touch sensor 120a by the first touch driving signal.

Figure 8:
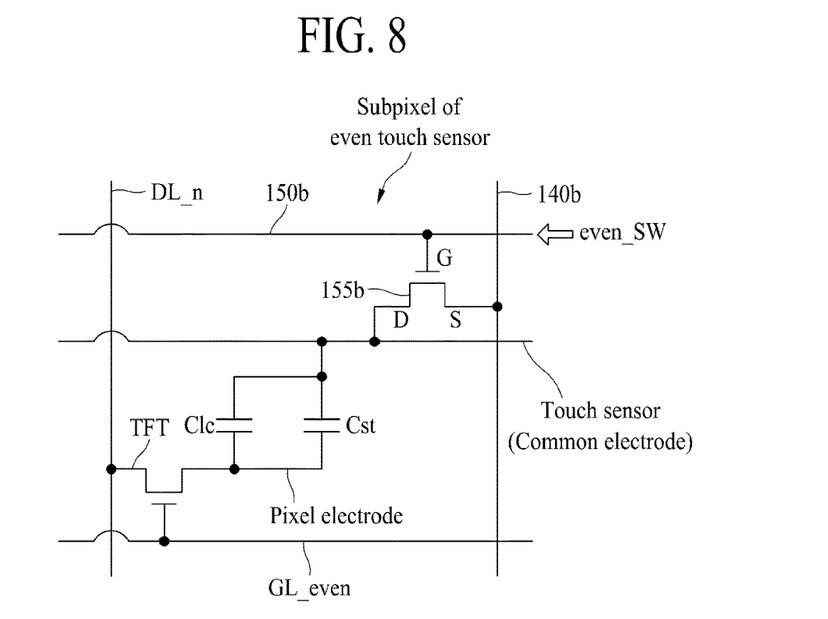
FIG. 8 is a diagram illustrating an equivalent circuit of a subpixel including a touch switch among a plurality of subpixels included in an even touch sensor.

FIG. 8 is a diagram illustrating an equivalent circuit of a subpixel including a touch switch among a plurality of subpixels included in an even touch sensor.

Referring to FIGS. 6 and 8, an even switching signal line 150b may be disposed in a subpixel including the even touch switch 155b among a plurality of subpixels corresponding to the even touch sensor 120b. Therefore, even switching signal lines 150b equal to the number of even touch sensors 120b provided in the touch display panel 110 may be provided. Here, the even switching signal lines 150b may be arranged in the same direction as the gate lines GL and may be formed simultaneously in a process of forming the gate lines GL.

Each of a plurality of even switching signal lines 150b may be connected to an even link line 160b connected to an output terminal of the gate driver 160. A gate electrode G of the even touch switch 155b included in each of the plurality of even touch sensors 120b may be connected to a corresponding even switching signal line 150b. A source electrode S of the even touch switch 155b may be connected to a corresponding even touch line 140b. Also, a drain electrode D of the even touch switch 155b may be connected to a corresponding even touch sensor 120b. In this case, the drain electrode D of the even touch switch 155b and the even touch sensor 120b may be disposed on physically different layers, and the drain electrode D of the even touch switch 155b may be electrically connected to the even touch sensor 120b through a contact part CNT.

The gate driver 160 may generate an even switch enable signal even_SW for turning on the even touch switch 155b included in each of the even touch sensor 120b in the plurality of touch sensors 120.

Subsequently, the gate driver 160 may output the even switch enable signal even_SW to the even link line 160b. The even switch enable signal even_SW output from the gate driver 160 may be supplied to the gate electrode G of the even touch switch 155b included in the even touch sensor 120b via the even switching signal line 150b.

When the even switch enable signal even_SW is supplied to the gate electrode G of the even touch switch 155b, the even touch switch 155b may be turned on. At this time, a second touch driving signal applied to the even touch line 140b may be supplied to the even touch sensor 120b via the even touch switch 155b. An electric charge may be charged into the even touch sensor 120b by the second touch driving signal.

Subsequently, the touch sensing unit 180 may receive capacitances respectively charged into the plurality of odd touch sensors 120a and the plurality of even touch sensors 120b. That is, in the touch display device 100 according to an embodiment of the present invention, the touch driving signal may be supplied to the plurality of odd touch sensors 120a and the plurality of even touch sensors 120b into which the plurality of touch sensors 120 are divided, and the touch sensing unit 180 may receive the capacitances from the plurality of touch sensors 120. Subsequently, the touch sensing unit 180 may sense a capacitance variation of each of the touch sensors 120 to determine whether there is a touch and detect a touch position.

Here, the touch sensing unit 180 of the touch display device 100 according to an embodiment of the present invention may sense a variation of a capacitance received from each of the plurality of odd touch sensors 120a to detect a touch position in a front surface of the touch display panel 110.

Moreover, the touch sensing unit 180 of the touch display device 100 according to an embodiment of the present invention may sense a variation of a capacitance received from each of the plurality of even touch sensors 120b to detect the touch position in the front surface of the touch display panel 110.

However, the present embodiment is not limited thereto. In other embodiments, the touch sensing unit 180 of the touch display device 100 according to an embodiment of the present invention may perform an arithmetic operation on capacitance values received from the plurality of odd touch sensors 120a and the plurality of even touch sensors 120b to sense a capacitance variation of each of all the touch sensors 120, thereby detecting the touch position in the front surface of the touch display panel 110.

The source/touch driver 130 may convert the digital RGB image data, supplied from the timing controller 170, into analog image signals, namely, RGB data voltages. Also, the source/touch driver 130 may respectively supply the data voltages to the plurality of data lines DL at a time when the TFT of each subpixel is turned on based on the data control signal DCS supplied from the timing controller 170. The data voltages may be respectively supplied to the plurality of subpixels, and the common voltage Vcom may be supplied to the plurality of touch sensors 120, thereby displaying an image. In this case, the power supply 190 may generate the common voltage Vcom and may supply the common voltage Vcom to the plurality of touch sensors 120. In another embodiment, the touch sensing unit 180 may generate the common voltage Vcom and may supply the common voltage Vcom to the plurality of touch sensors 120.

Figure 9:
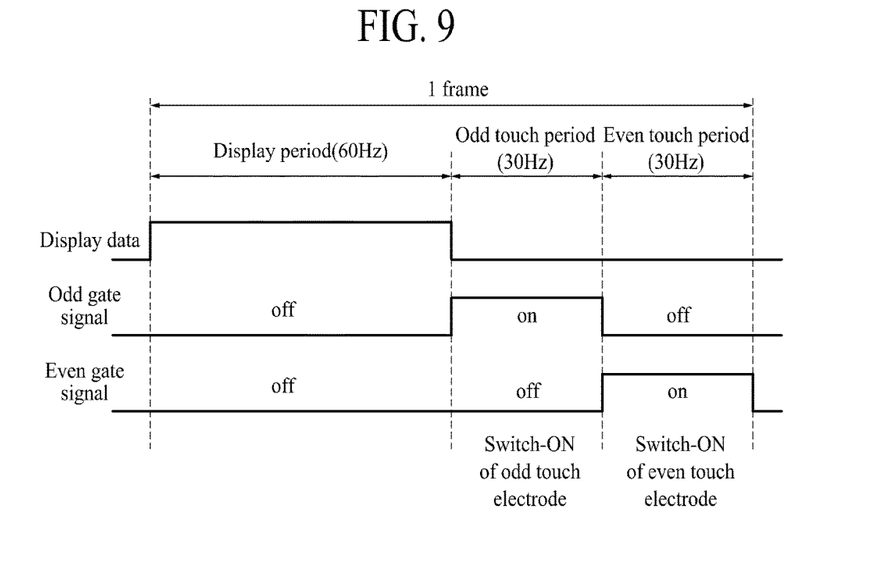
FIG. 9 is a diagram illustrating a method of driving a touch display device according to an embodiment of the present invention.

FIG. 9 is a diagram illustrating a method of driving a touch display device according to an embodiment of the present invention.

Referring to FIG. 9, an image may be displayed at a driving frequency of 60 Hz in the display period, and in the odd touch period and the even touch period, a touch sensing operation may be performed at a driving frequency of 30 Hz.

The touch driving signal may be supplied to the plurality of odd touch sensors 120a and the plurality of even touch sensors 120b into which the plurality of touch sensors 120 are divided, and the touch sensing unit 180 may receive capacitances from all of the touch sensors 120.

In detail, in the odd touch period, the odd switch enable signal odd_SW may be supplied to the odd touch switches 155a included in the respective odd touch sensors 120a to turn on the odd touch switches 155a. Also, in the odd touch period, the first touch driving signal may be supplied to each of the plurality of odd touch sensors 120a. Subsequently, the touch sensing unit 180 may sense a variation of a capacitance received from each of the plurality of odd touch sensors 120a to detect a touch position.

In the even touch period, the even switch enable signal even_SW may be supplied to the even touch switches 155b included in the respective even touch sensors 120b to turn on the even touch switches 155b. Also, in the even touch period, the second touch driving signal may be supplied to each of the plurality of even touch sensors 120b. Subsequently, the touch sensing unit 180 may sense a variation of a capacitance received from each of the plurality of even touch sensors 120b to detect a touch position. Here, the first and second touch driving signals supplied to the plurality of touch sensors 120 may be generated in various forms such as a square-wave pulse, a sine wave, a triangle wave, etc.

Figure 10:
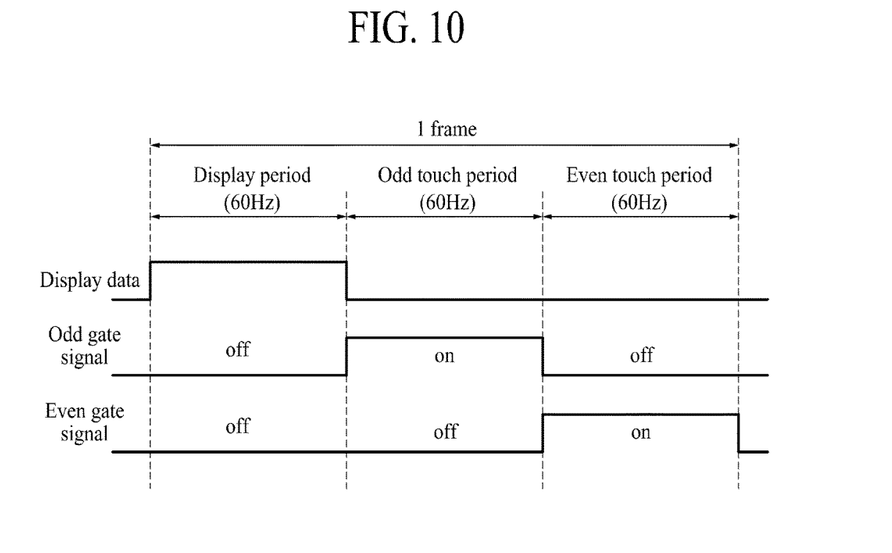
FIG. 10 is a diagram illustrating a method of driving a touch display device according to another embodiment of the present invention.

FIG. 10 is a diagram illustrating a method of driving a touch display device according to another embodiment of the present invention.

Referring to FIG. 10, an image may be displayed at a driving frequency of 60 Hz in the display period, and in the odd touch period and the even touch period, a touch sensing operation may be performed at a driving frequency of 60 Hz.

Hereinabove, an example where the touch driver is disposed in the source/touch driver 130 and is spaced apart from the touch sensing unit has been described. However, the present embodiment is not limited thereto. In other embodiments, the touch driver and the touch sensing unit may be mounted on one printed circuit board (PCB) or may be integrated into one IC.

As a detailed example, a touch IC may include a touch driver, which supplies a touch driving signal to a plurality of touch sensors disposed in a touch display panel, and a touch sensing unit that senses a variation of a capacitance received from each of the plurality of touch sensors.

Here, the touch driver may divide the plurality of touch sensors into a plurality of odd touch sensors and a plurality of even touch sensors. The touch driver may supply a touch driving signal to the plurality of odd touch sensors in an odd touch period. Also, the touch driver may supply the touch driving signal to the plurality of even touch sensors in an even touch period.

The touch sensing unit may sense a variation of a capacitance received from each of the plurality of odd touch sensors in the odd touch period. Also, the touch sensing unit may sense a variation of a capacitance received from each of the plurality of even touch sensors in the even touch period.

In another embodiment, the touch sensing unit may perform an arithmetic operation on capacitance values received from the plurality of odd touch sensors and the plurality of even touch sensors to sense a capacitance variation of each of all the touch sensors.

Essential elements and functions of the above-described touch display device 100 according to an embodiment of the present invention will be described below. The touch display device 100 according to an embodiment of the present invention may include the touch display panel 110, where the plurality of touch sensors 120 are disposed, and the driving circuit unit. The plurality of touch sensors 120 disposed in the touch display panel 110 may each be disposed to correspond to a plurality of subpixels, and each of the plurality of touch sensors 120 may each include one or more touch switches 155a or 155b. Here, the touch switches 155a or 155b included in each of the plurality of touch sensors 120 may divisionally drive the plurality of touch sensors 120 by 1/n (where n is a natural number equal to or more than two). In the driving circuit unit, the timing controller 170 may generate the switch control signal SCS for controlling the plurality of touch switches 155a and 155b, and the gate driver 160 may generate the switch enable signals odd_SW and even_SW according to the switch control signal SCS and may respectively supply the switch enable signals odd_SW and even_SW to the plurality of touch switches 155a and 155b. Also, the source/touch driver 130 may respectively supply image signals to the plurality of subpixels and may supply the touch driving signal to the plurality of touch sensors 120, and the touch sensing unit 180 may sense a variation of a capacitance received from each of the plurality of touch sensors 120.

The touch display device 100 according to an embodiment of the present invention may divide the plurality of touch sensors 120 into the plurality of odd touch sensors 120a and the plurality of even touch sensors 120b, supply the touch driving signal to the plurality of odd touch sensors 120a and the plurality of even touch sensors 120b, and receive a capacitance from each of the plurality of touch sensors 120. In the odd touch period, the gate driver 160 may supply the odd switch enable signal odd_SW to the odd touch switches 155a respectively included in the plurality of odd touch sensors 120a to turn on the odd touch switches 155a. In the even touch period, the gate driver 160 may supply the even switch enable signal even_SW to the even touch switches 155b respectively included in the plurality of even touch sensors 120b to turn on the even touch switches 155b.

In the odd touch period, the source/touch driver 130 of the touch display device 100 according to an embodiment of the present embodiment may supply the first touch driving signal to the plurality of odd touch sensors 120a. In the even touch period, the source/touch driver 130 may supply the second touch driving signal to the plurality of even touch sensors 120b.

The touch sensing unit 180 of the touch display device 100 according to an embodiment of the present embodiment may sense a variation of a capacitance received from each of the plurality of odd touch sensors 120a to detect a touch position in the front surface of the touch display panel 110.

The touch sensing unit 180 of the touch display device 100 according to an embodiment of the present invention may sense a variation of a capacitance received from each of the plurality of even touch sensors 120b to detect the touch position in the front surface of the touch display panel 110.

In another embodiment, the touch sensing unit 180 of the touch display device 100 according to an embodiment of the present invention may perform an arithmetic operation on capacitance values received from the plurality of odd touch sensors 120a and the plurality of even touch sensors 120b to sense a capacitance variation of each of all the touch sensors 120, thereby detecting the touch position in the front surface of the touch display panel 110.

The power supply 190 of the touch display device 100 according to an embodiment of the present invention may supply the common voltage to the plurality of touch sensors in the display period.

In the in-cell touch type touch display device according to the embodiments of the present invention, the number of the touch lines is reduced by ½ or more in comparison with the related art.

In the in-cell touch type touch display device according to the embodiments of the present invention, the number of the input and output channels of each of the source/touch driving ICs is reduced, thereby decreasing a size of the source/touch driver.

In the in-cell touch type touch display device according to the embodiments of the present invention, the number of the input and output channels of each of the source/touch driving ICs is reduced, thereby decreasing the manufacturing cost.

In the in-cell touch type touch display device according to the embodiments of the present invention, a transmittance is enhanced, thereby enhancing display quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch display device comprising:
a plurality of touch sensors disposed in a touch display panel, the plurality of touch sensors include a first touch sensor, a second touch sensor, a third touch sensor and a fourth touch sensor;
a plurality of touch switches disposed in the touch display panel, the plurality of touch switches include a first touch switch, a second touch switch, a third touch switch and a fourth touch switch;
a plurality of switching signal lines disposed in the touch display panel, the plurality of the switching signal lines include a first switching signal line, a second switching signal line, a third switching signal line and a fourth switching signal line;
a plurality of touch lines disposed in the touch display panel, the plurality of the touch lines include a first touch line and a second touch line; and
a gate driver configured supply a switch enable signal to the plurality of touch switches via the plurality of switching signal lines,
wherein the first touch line is electrically connected to the first touch sensor via the first touch switch and the second touch sensor via the second touch switch,
wherein the second touch line is electrically connected to the third touch sensor via the third touch switch and the fourth touch sensor via the fourth touch switch,
wherein the first switching signal line is electrically connected to the first touch switch and the second switching signal line is electrically connected to the second touch switch,
wherein the third switching signal line is electrically connected to the third touch switch and the fourth switching signal line is electrically connected to the fourth touch switch,
wherein the first touch switch and the third touch switch are turned on during a first touch period,
wherein the second touch switch and the fourth touch switch are turned on during a second touch period.

2. The touch display device of claim 1, wherein in the first touch period, the gate driver supplies an odd switch enable signal to the first touch switch and the third touch switch respectively included in the first touch sensor and the third touch sensor to turn on the first touch switch and the third touch switch, and
wherein in the second touch period, the gate driver supplies an even switch enable signal to the second touch switch and the fourth touch switch respectively included in the second touch sensor and the fourth touch sensor to turn on the second touch switch and the fourth touch switch.

3. The touch display device of claim 1, further comprising: a touch sensing unit,
wherein the touch sensing unit senses a variation of a capacitance received from each of the plurality of touch sensors to detect a touch position in a front surface of the touch display panel.

4. The touch display device of claim 1, further comprising: a power supply supplying a common voltage to the plurality of touch sensors in a display period.

5. The touch display device of claim 1, wherein the first touch line is overlapped with the first touch sensor, the second touch sensor, the third touch sensor and the fourth touch sensor,
wherein the second touch line is overlapped with the third touch sensor and the fourth touch sensor, and
wherein the second touch line is not overlapped with the first touch line.

6. The touch display device of claim 1, further comprising a plurality of contact parts including a first contact part, a second contact part, a third contact part and a fourth contact part,
wherein the first touch switch is electrically connected to the first touch sensor via the first contact part,
wherein the second touch switch is electrically connected to the second touch sensor via the second contact part,
wherein the third touch switch is electrically connected to the third touch sensor via the third contact part, and
wherein the fourth touch switch is electrically connected to the fourth touch sensor via the fourth contact part.

7. The touch display device of claim 6, wherein a distance between the first touch line and the first contact part is same with a distance between the first touch line and the second contact part,
wherein a distance between the second touch line and the third contact part is same with a distance between a second touch line and the fourth contact part.

8. The touch display device of claim 1, wherein the plurality of touch switches disposed in the touch display panel are a thin film transistor (TFT).

9. The touch display device of claim 1, further comprising a fifth touch switch, a sixth touch switch, a seventh touch switch and a eighth touch switch,
wherein the first touch line is electrically connected to the first touch sensor via the fifth touch switch and the second touch sensor via the sixth touch switch,
wherein the second touch line is electrically connected to the third touch sensor via the seventh touch switch and the fourth touch sensor via the eighth touch switch.

10. The touch display device of claim 1, further comprising a touch driver, wherein the touch driver supplies the touch driving signal to vertically adjacent the first touch sensor and the second touch sensor through the first touch line,
wherein the touch driver supplies the touch driving signal to vertically adjacent the third touch sensor and the fourth touch sensor through the second touch line.

* * * * *